(12) United States Patent
Tysak

(10) Patent No.: US 6,319,977 B1
(45) Date of Patent: Nov. 20, 2001

(54) AQUEOUS POLISH COMPOSITIONS CONTAINING ACID-AMINE LATEXES

(75) Inventor: Theodore Tysak, Ambler, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 08/911,974

(22) Filed: Aug. 15, 1997

Related U.S. Application Data

(60) Provisional application No. 60/024,422, filed on Aug. 20, 1996.

(51) Int. Cl.$^7$ ...................................................... C08L 37/00
(52) U.S. Cl. ........................ 524/549; 524/548; 524/555; 524/556; 524/558
(58) Field of Search ..................................... 524/555, 556, 524/558, 548, 549

(56) References Cited

U.S. PATENT DOCUMENTS

| | | |
|---|---|---|
| 3,404,114 | 10/1968 | Snyder et al. . |
| 3,984,299 | 10/1976 | Jerabek . |
| 4,166,882 | 9/1979 | Das et al. . |
| 4,760,110 * | 7/1988 | Das ........................................ 524/460 |
| 5,266,165 | 11/1993 | DeClercq et al. ................. 162/168.2 |
| 5,428,107 * | 6/1995 | Tysak et al. .......................... 525/102 |
| 5,498,659 * | 3/1996 | Esser ..................................... 524/549 |
| 5,693,732 * | 12/1997 | Sharma et al. ....................... 526/263 |
| 5,849,833 * | 12/1998 | Puschak et al. ..................... 524/521 |
| 5,872,200 * | 2/1999 | Sharma et al. ....................... 526/263 |

FOREIGN PATENT DOCUMENTS

| | | |
|---|---|---|
| 1119758 | 3/1982 | (CA) . |
| 555774 * | 8/1993 | (EP) . |

OTHER PUBLICATIONS

Abstract (Basic): DE 4324001, Solvent–free precursor for paper–sizing material—comprises half–amide made by reacting polystyrene–maleic anhydride copolymer in acetone with alkylamine, adding water and distilling acetone.

* cited by examiner

*Primary Examiner*—Judy M. Reddick
(74) *Attorney, Agent, or Firm*—Ronald D. Bakule

(57) ABSTRACT

Disclosed is the use of film-forming acid-amine latexes in aqueous polish compositions whereby the resulting film is durable, tough, and resistant to detergent, but amine-strippable. Such polish compositions are metal-free and contain relatively low levels of volatile organic compounds.

5 Claims, No Drawings

AQUEOUS POLISH COMPOSITIONS CONTAINING ACID-AMINE LATEXES

This application claims the benefit of U.S. Provisional Application Serial No. 60/024,422, filed Aug. 20, 1996.

BACKGROUND OF THE INVENTION

The present invention relates to ambient curing, film-forming acid-amine latex compositions These latex compositions have low levels of volatile organic compounds, and provide dry films having good resistance properties and durability. More particularly, the latex compositions of the present invention produce polish and coating compositions which exhibit improved properties such as black heel and scuff mark resistance and mar resistance. In addition, polish and coatings compositions produced from the latex compositions of the present invention exhibit detergent resistance and removability characteristics similar to conventional metal ion crosslinked aqueous-based polymers.

In polish and coating applications, durability, toughness, and detergent resistance are important characteristics which must be balanced against ease of removability. This balance has historically been maintained by the use of transition metal complex crosslinked polymers (metal crosslinked polymers). These types of polymers can be readily formulated into single package polish and coating systems. The advantages of these metal crosslinked polymers is offset by the environmental concerns surrounding the use of heavy metal crosslinking agents and the relatively high amounts of volatile organic compounds necessary in coating or polish compositions formulated with these types of polymers.

In response to these concerns, various non-metal crosslinked aqueous based polymers have been developed for coating and polish compositions. To date, the overall performance of these types of polymers in coating and polish applications has been far inferior to the performance of the metal crosslinked polymers. The only exception has been the use of certain multiple package systems of these non-metal crosslinked polymers, which provide performance equivalent to that obtained using the metal crosslinked polymers. Aside from the drawbacks of using a multiple package system where the end user must mix at least two components together prior to using the coating or polish composition, the use of these systems is impractical because the resultant coatings lack sufficient film removability properties.

A solution to the detergent resistance and removability properties of non-metal crosslinked, single package aqueous based polymers is disclosed in U.S. Pat. No. 5,428,107 (Tysak et al.). In this patent, the disclosed coating composition contains a polymer made with acid-functional monomer and having acetoacetate groups, which is post-treated with an amino-functional silane. While this composition can be used to produce durable, zinc-free coatings with a good detergent resistance/removability balance, it still contains relatively high levels of volatile organic compounds.

Another solution to the detergent resistance and removability properties of non-metal crosslinked, single package aqueous based polymers is provided in U.S. patent application Ser. No. 07/464,844 filed Feb. 12, 1996 (Gray et al.). Gray et al. disclose a metal-free coating composition that is cross-linked before film formation and that contains selectively swellable emulsion polymer functionalities. While this composition can be used to produce durable, zinc-free coatings with a good detergent resistance/removability balance, it also contains relatively high levels of volatile organic compounds.

STATEMENT OF THE INVENTION

The present invention is directed to an amine-strippable, detergent resistant aqueous polish composition comprising a self-crosslinking, ambient curing, film-forming acid-amine latex, said latex comprising between 0.5 and 12.5 wt % total acid functionality and between 1.0 and 22.5 wt % total amine functionality, based on the total monomer weight.

Such compositions of the present invention are preferably those wherein the latex is essentially free of polyvalent metal ionic crosslinkers, and preferably wherein the amount of volatile organic compounds is 8 wt % or less.

The present invention is also directed to a process for improving the mar resistance, scuff mark resistance, black heel mark resistance, and scratch resistance of a flooring substrate, comprising applying to the substrate an amine-strippable, detergent resistant aqueous polish composition of the present invention, and allowing the composition to cure and form a protective film on such flooring substrate.

DETAILED DESCRIPTION OF THE INVENTION

As used in this specification, the following terms have the following definitions, unless the context clearly indicates otherwise. "Latex" or "latex composition" refers to a dispersion of a water-insoluble polymer which may be prepared by conventional polymerization techniques such as, for example, by emulsion polymerization, and "resin" refers to the polymer in the latex. "Acid-amine polymer" or "acid- and amine-functional polymer" refers to a polymer containing both acid and amine functionality; whereas, "acid-amine latex" or "acid- and amine-functional latex" refers to a latex where the particles, but not necessarily the individual polymer strands making up the particle, contain both acid and amine functionality. "Diamine" refers to a compound containing at least two amine groups, and thus includes tri-amines and so on. "Volatile organic compound" or "VOC" refers to any organic compound having a boiling point of less than 250_C at atmospheric pressure. A coating composition which is "film-forming" means that the composition has a minimum Film Forming Temperature ("MFFT") at or below ambient temperature to allow for fusion of the polymer into a continuous film. The terms "polish" and "coating" are used interchangeably in reference to polish compositions, coating compositions, or both, unless specifically identified otherwise. The following abbreviations are used: mL=milliliters; g=grams; Tg=the glass transition temperature; and eq=equivalents. Ranges specified are to be read as inclusive, unless specifically identified otherwise.

The present invention provides for self-crosslinking, ambient curing, film-forming acid-amine latexes. When used to produce polish compositions, these acid-amine latexes exhibit improved properties such as detergent resistance, black heel and scuff mark resistance, and mar resistance. These acid-amine latexes also provide coating compositions having good removability characteristics.

Acid-amine latexes which can be formulated into the coating or polish compositions of the present invention include any film-forming, water-dispersable polymers having both acid and amine functionality within the dispersed polymer particle. Although it is preferred that both acid and amine functionality are present with particular polymer strands (i.e., acid-amine polymer), it is not necessary, so long as the dispersed polymer particles contain both functionalities (i.e., acid-amine latex). Such acid-amine latexes can be found, for example, in U.S. Pat. No. 3,404,114 (Snyder et al.) and U.S. Pat. No. 4,760,110 (Das). The contents of these patents are hereby incorporated by reference herein.

The overall acid functionality of the acid-amine latex will generally be present in the latex in an amount between 0.5 and 12.5 wt % based on the total monomer content, preferably between 3 and 10 wt %, and most preferably between 6.5 and 8.5 wt %. The overall amine functionality of the acid-amine latex will typically be present in the latex in an amount between 1.0 and 22.5 wt % based on the total monomer weight, preferably between 1.5 and 16 wt %, and most preferably between 3 and 6 wt %.

The acid-amine latexes of the present invention may be in the form of single or multi-staged particles. Multi-staged particles will comprise at least two mutually incompatible copolymers having any of a number of morphological configurations—for example: core/shell; core/shell particles with shell stages incompletely encapsulating the core; core/shell particles with a multiplicity of cores, interpenetrating network particles; and the like, where the greater portion of the surface area of the particles will be occupied by at least one outer stage, and the interior of the particle will be occupied by at least one inner stage.

Preferred acid-amine polymers are those produced by the reaction of certain diamines with an equivalent of a polymeric anhydride in an emulsion polymer to generate both an acid group and an amido-amine group within the emulsion polymer. These diamines contain a first amine which is a primary or non-hindered secondary amine, and a second amine which is a tertiary or hindered secondary amine. The amido portion of the amido-amine moiety is generated by reacting the primary or non-hindered secondary amine end of the diamine with the anhydride functionality in the emulsion polymer. The tertiary or hindered secondary amine part of the diamine, which is not reactive with the anhydride, is retained "as is," thereby producing an emulsion polymer which contains both an acid-functional group and an amine-functional group. Such preferred acid-amine polymers are described in further detail in the copending application of Madle entitled "Process For Preparing Polymer Compositions Containing Both Acid And Amine Functionality," filed concurrently herewith (the "Madle acid-amine polymers").

In general, these Madle acid-amine polymers are prepared using free-radical initiated addition polymerization. Although the polymerization is preferably conducted in an aqueous medium, polar or non-polar organic solvents, or combinations thereof, may also be employed. As such polymerization techniques are well known to those skilled in the art, they will not be further discussed herein; however, the modifications employed in the method of the present invention are summarized here. First, an anhydride monomer is copolymerized with an ethylenically unsaturated monomer in the appropriate medium to produce an anhydride polymer. At that point, base is introduced into the system, followed immediately by addition of a diamine, and the components are allowed to react. In a system where water or a polar solvent is present in the medium, the anhydride polymer is subject to attack by the medium; therefore, addition of the base and the diamine must be made before the anhydride polymer has significantly decomposed.

In preparing the Madle acid-amine latexes, the most preferred diamines include: N,N-dimethylethylenediamine, aminopropyl morpholine, 3-dimethylaminopropylamine, triacetonediamine, and N-butyl triacetone diamine. The useful molar ratio of diamine to anhydride ranges from 0.001 to 2 moles of diamine per mole of anhydride. The preferred anhydride monomers are acrylic or methacrylic anhydride. The amount of anhydride monomer employed during the polymerization may range from 0.1 to 50.0 wt %, based on the total monomer weight.

In another embodiment of the present invention, amino functional silane compounds containing a primary amine moiety capable of reacting with the anhydride functionality in the polymer can be used to produce self-crosslinking, ambient curing, film-forming latexes. The preparation of these latter type of polymers is conducted in a manner similar to that described for the Madle acid-amine polymers.

The acid-amine latexes of the present invention may be formulated for the chosen end use in accordance with procedures known to those skilled in the formulatory arts (e.g., the ingredients used, their proportions, and the manner of their addition). Additives such as thickeners, dispersants, pigments, extenders, fillers, anti-freeze agents, plasticizers, adhesion promoters, coalescents, wetting agents, defoamers, colorants, non-aldehyde based biocides, soaps, and slip agents may incorporated in these compositions in accordance with common practice.

TEST METHODS

The performance of the polish compositions of the present invention was tested relative to controls using standard test methods for the floor polish industry. The test substrate used in all the tests was vinyl composition tile.

Black Heel Mark and Scuff Resistance—The method for determining black heel and scuff resistance described in Chemical Specialty Manufacturers Association Bulletin No. 9–73 was utilized, except that commercially available rubber shoe heels were used in place of the recommended 2" (5.08 cm) rubber cubes. Furthermore, instead of subjectively rating the coated substrate, we determined the number of marks per square inch (6.45 cm$^2$) of the coated substrate area which was covered by black heel and scuff marks. A black heel mark is an actual deposition of rubber onto or into the coating, whereas a scuff mark results from physical displacement of the coating which appears as an area of reduced gloss. Scuff and black heel marks can occur simultaneously at the point where the heel impacts the substrate; that is, upon removal of a black heel mark, a scuff may be present.

Gloss—The method for determining the gloss performance of polish compositions is described in "Annual Book of ASTM Standards," Section 15, Volume 15.04, Test Procedure ASTM D 1455.

Recoatability—The method for determining the recoatability of water-based emulsion floor polishes is described in "Annual Book of ASTM Standards," Section 15, Volume 15.04, Test Procedure ASTM D 3153.

Water Resistance—The method for determining the water resistance of polish compositions is described in "Annual Book of ASTM Standards," Section 15, Volume 15.04, Test Procedure TM51 D 1793, and the following scale was used to rate the water resistance of the coating compositions:

Excellent—No water mark or perceptible damage to coating

Very Good—Faint water outline

Good—Slight degree of film whitening

Fair—Film whitening with some blisters and lifting

Poor—Complete film failure with gross whitening and loss of adhesion

Detergent Resistance—The method for determining detergent resistance is described in "Annual Book of ASTM Standards," Section 15, Volume 15.04, Test Procedure ASTM D 3207, except that a 1/20 dilution of Forward® (S.C. Johnson and Sons, Inc.; Racine, Wis.) in water was used as test detergent solution.

Removability—The method for determining polish removability is described in "Annual Book of ASTM Standards," Section 15, Volume 15.04, Test Procedure ASTM D 1792.

Mar Resistance—This test is based on striking the dried coating at a shallow angle with a hard object. In the examples provided, the object was the fingernail of the individual performing the test. This test gives an indication of how the coating will resist marring, which leads to gloss reduction of the coating. After the coating is applied to the substrate and allowed to cure, the coated substrate is placed on a solid surface such as a table top and struck with the operator's fingernail. The operator's fingernail is kept parallel to the coated surface and the impact angle is greater than 45° from the normal of the surface, to increase the likelihood of marking the coating. When comparing coatings, it is important that the same operator perform the test. This test is designed to distinguish relative differences. We used the following rating system:

1=Coating can't be visibly scratched
2=Very slight scratch, visible at only a few angles
3=Slight scratch, visible at any angle
4=Very visible scratch
5=Coating is easily torn VOC—The level of organic compounds reported is a percentage by weight of organic coalescent that was added to the coating composition.

Film Formation—A draw-down using 0.4 mL of the coating composition was applied by means of a 2 inch (5.08 cm) wide blade applicator (as specified in ASTM D 1436), having a clearance of 0.008 inches (0.02 cm), to a length of 4 inches (10.16 cm) on a vinyl composition tile. Immediately after application of the polish, the tile was placed on a level surface in a refrigerator at 10° C. The dried film was rated as follows:

Excellent—No crazing
Very Good—Slight edge crazing
Good—Definite edge crazing
Fair—Definite edge crazing with very slight center crazing
Poor—Complete edge and center crazing Glass Transition Temperature—All polymer Tg values in these examples were measured by differential scanning calorimetry (DSC), used at a rate of heating of 20° C. per minute with the Tg taken at the midpoint of the transition.

The following examples are presented to illustrate further various aspects of the present invention, but are not intended to limit the scope of the invention in any respect. Unless otherwise indicated, percentages are by weight based on the total solids. The abbreviations listed below are used throughout the examples.

| | |
|---|---|
| BA = Butyl Acrylate | MMA = Methyl Methacrylate |
| MAA = Methacrylic Acid | ALMA = Allyl Methacrylate |
| STY = Styrene | MAAn = Methacrylic Anhydride |
| DMAEMA = Dimethylaminoethylmethacrylate | |
| DMAPMA = Dimethylaminopropylmethacrylate | |

The following general formulation was used for the coating compositions of Examples 6, 9, 14, 17, 20, and 23–25. The amount of water was adjusted to maintain a solids level of 20% and to compensate for differences in the solids content of each latex and the level of coalescent. The ingredients are listed in order of addition.

| Ingredient | Function | Amount (wt %) |
|---|---|---|
| Water | diluent | 40.78 |
| FC-129 ® (1%)[1] | wetting agent | 1.07 |
| KATHON ® CG/ICP biocide (1.5%)[2] | biocide | 0.03 |
| SWS-211[3] | defoamer | 0.02 |
| Diethylene glycol ethyl ether | coalescent | varied[6] |
| Tributoxy ethyl phosphate | leveling aid | 1.65 |
| Latex polymer (38%) | vehicle | 43.52 |
| A-C ® 325N polyethylene wax (35%)[4] | polyethylene wax emulsion | 2.63 |
| POLENE ® E-43N polymer (40%)[5] | polypropylene wax emulsion | 2.30 |
| Composition Constants | | |
| Polymer/Wax Ratio: 90/10 | | |
| Composition Solids: 20 wt % | | |

[1]3M Co. (Minneapolis, MN)
[2]Rohm and Haas Co. (Philadelphia, PA)
[3]Wacker Silicones Corp. (Adrian, MI)
[4]Allied-Signal Corp. (Morristown, NJ)
[5]Eastman Chemical Corp. (Eastport, TN)
[6]Amount varied from 0–8 wt %, depending on the composition

EXAMPLE 1

Non-Metal Crosslinked Aqueous Based Latex (Comparative)

An emulsified monomer mixture was prepared by slowly adding the following monomers, in sequence, to a stirred solution of 77 g of a 28 wt % solution of sodium lauryl sulfate (SLS) in 2600 g of deionized water.

| Monomer | Weight (g) | wt %* |
|---|---|---|
| BA | 1981 | 28.00 |
| MMA | 2441 | 34.25 |
| MAA | 849 | 12.00 |
| STY | 1769 | 25.00 |
| ALMA | 53 | 0.75 |

*based on total monomer weight

In a suitable reaction vessel equipped with a thermometer, condensor, and stirrer, a solution of 176 g of 28% SLS solution and 5150 g of deionized water was heated to 80–85° C. The monomer emulsion described above (164 g portion) was added all at once to the reaction vessel and the temperature adjusted to 80–82° C. The kettle charge of ammonium persulfate (APS) catalyst solution (41.5 g dissolved in 200 g water) was then added all at once. Within about five minutes, the onset of polymerization was signaled by a temperature rise of 3–5° C. and a change in the appearance (color and opacity) of the reaction mixture. When the exotherm ceased, the remaining monomer mixture and the cofeed catalyst solution (20.7 g APS in 600 g of deionozed water) were gradually added to the reaction vessel. The rate of addition was chosen based on the rate at which the heat of the polymerization reaction could be removed by cooling (2–3 hrs). The polymerization reaction temperature was maintained at 80–84° C by cooling as necessary. When the additions were completed, the monomer mixture and catalyst containers and feed lines were rinsed to the ketle with water. The batch was cooled to ambient temperature for dilution to 38% total solids, pH adjustment, and storage. The pH was adjusted with an aqueous ammonia/ammonium bicarbonate solution to pH 7.0 to 8.0 to improve the emulsion viscosity stability during storage and to compatabilize it with the other ingredients used in formulating the emulsion polymer into a coating composition.

EXAMPLE 2

Metal Crosslinked Aqueous Based Latex (Comparative)

A latex was prepared in accordance with the procedure described in Example 1, except that ALMA was not added to the composition, and the resultant polymer was not diluted to 38% total solids. The zinc (0.5 equivalents) was added as a divalent ion in the following manner.

The latex of Example 1 (1000 g) was added to a 2-liter glass container and heated to 50° C. To the heated latex were added 50 g of polyoxyethylene (23) lauryl ether, and 36.7 g of a commercial zinc crosslinking/complexing agent (15% ZnO), and the mixture stirred for 30 minutes at 50° C. The latex was then cooled and filtered, producing a latex modified with 0.5 equivalents of zinc. The resulting metal crosslinked polymer had a pH of 8.8 and and was adjusted to 38% total solids.

EXAMPLE 3

Anhydride Latex Containing No Amine Functionality (Comparative)

An emulsified monomer mixture was prepared by slowly adding the following monomers, in sequence, to a stirred solution of 77 g of a 28% solution of sodium lauryl sulfate in 2600 g of deionized water:

| Monomer | Weight (g) | wt %* |
|---|---|---|
| BA | 3688 | 52.0 |
| MMA | 2979 | 42.0 |
| MAA | 71 | 1.0 |
| MAAn | 355 | 5.0 |

*based on total monomer weight

In a suitable reaction vessel equipped with a thermometer, condenser, and stirrer, a solution of 176 g of 28% SLS solution and 5150 g of deionized water was heated to 85° C. The monomer emulsion described above (164 g portion) was added all at once to the reaction vessel. The kettle charge of ammonium persulfate (APS) catalyst solution (41.5 g dissolved in 200 g water) was added all at once. Within about five minutes, the onset of polymerization was signaled by a temperature rise of 3–5° C. and a change in the appearance (color and opacity) of the reaction mixture. When the exotherm ceased, the remaining monomer mixture and the cofeed catalyst solution (20.7 g APS in 600 g of deionized water) were gradually added to the reaction vessel. The rate of addition was chosen based on the rate at which the heat of the polymerization reaction could be removed by cooling (2–3 hrs). The polymerization reaction temperature was maintained at 80–85° C. by cooling as necessary. When the additions were completed, the monomer mixture, catalyst containers, and feed lines were rinsed to the kettle with water. The batch was cooled to 45° C., and the pH was adjusted with an aqueous ammonia/ammonium bicarbonate solution to pH 7.0 to improve the emulsion viscosity stability during storage and to compatabilize it with the other ingredients used in formulating the emulsion polymer. The emulsion had a solids content of 46% with a measured Tg of 21° C. and was then allowed to cool to ambient temperature.

EXAMPLE 4

Acid-Amine Polymer (0.5 eq Aminopropyl Morpholine)

All levels of amine functional compounds in these examples are based on equivalents of primary/secondary amino moiety for each equivalent of anhydride functionality.

The latex of Example 3 (100 g) was added to a 200-mL container and heated to 45° C. To the heated latex was added 1.43 g of Triton® X-405 surfactant (70%) (Union Carbide, Inc.; Danbury, Conn.). This mixture was allowed to stand for five minutes, then 1.08 g of aminopropylmorpholine was charged to the container. The reaction mixture was stirred for one hour, with heating as necessary to maintain the temperature at 45° C. The reaction mixture was then cooled, filtered, and diluted with water to provide an emulsion having 38% total solids.

EXAMPLE 5

Acid-Amine Polymer (1.0 eq Aminopropyl Morpholine)

The procedure of Example 4 was followed, except that 2.15 g of aminopropyl morpholine was added to 100 g of of the latex of Example 3.

EXAMPLE 6

Coating compositions made using the polymers of Examples 1–5 were compared for durability and resistance of coatings.

| Property | Example 1* | Example 2* | Example 3* | Example 4 | Example 5 |
|---|---|---|---|---|---|
| VOC | 8 | 8 | 0 | 0 | 0 |
| Film Formation | Excellent | Excellent | Excellent | Excellent | Excellent |
| Gloss, 60°/20° | 68/32 | 69/34 | 66/27 | 68/30 | 68/30 |
| Recoatability | Good | Good | Good | Good | Good |
| Water Resistance | Good | Very Good | Very Good | Very Good | Very Good |
| Detergent Resistance | Fair | Very Good | Excellent | Very Good | Very Good |
| Removability | Excellent | Fair | Poor | Poor | Fair |
| Mar Resistance | 3 | 3 | 5 | 4 | 3 |
| Black Heel Mark Resistance | 0.5 | 0.6 | 1.5 | 0.4 | 0.2 |
| Scuff Mark Resistance | 0.7 | 0.7 | 1.2 | 0.85 | 0.7 |

*Comparative

The results show that coating compositions made with the acid-amine polymers of the present invention have increased resistance to mar, scuff and black heel marks, as compared to the same composition without amine functional compounds.

EXAMPLE 7

Anhydride Latex Containing No Amine Functionality (Comparative)

The procedure of Example 3 was followed, except that the monomer composition was 47 BA/42 MMA/10 MAAn/1 MAA. This yielded a polymer having a Tg of 36° C.

EXAMPLE 8

Acid-Amine Polymer (1.0 eq Aminopropyl Morpholine)

The coating composition of Example 8 contains 1.0 equivalents of aminopropyl morpholine. The procedure of Example 4 was followed, except that 4.29 g of aminopropyl morpholine was added to 100 g of the latex of Example 7.

EXAMPLE 9

The compositions of Examples 7–8 were tested for resistance properties and durability. Examples 7–9 demonstrate the improvement in durability and resistance properties of the invention, using a polymer having a higher level of anhydride functional monomer than that of Examples 3–6. Example 7 is a comparative containing no amine.

| Property/ | Example 1 | Example 2 | Example 7 | Example 8 |
|---|---|---|---|---|
| VOC | 8 | 8 | 0 | 0 |
| Film Formation | Excellent | Excellent | VG | Excellent |
| Gloss, 60°/20° | 68/32 | 69/34 | 67/31 | 66/27 |
| Recoatability | Good | Good | Good | Good |
| Water Resistance | Good | Very Good | Very Good | Very Good |
| Detergent Resistance | Fair | VG-Exc | VG | Good |
| Removability | Excellent | Fair | Poor | Good |
| Mar Resistance | 3 | 3 | 4 | 3 |
| Scuff Mark Resistance | 0.7 | 0.7 | 1.0 | 0.7 |
| Black Heel Mark Resistance | 0.5 | 0.6 | 0.85 | 0 |

*Comparative

The results show that coating compositions of the present invention having anhydride functionality and amine functional compounds have increased resistance to mar, scuff and black heel marks, compared to the same composition without amine functional compounds.

EXAMPLE 10

Acid-Amine Polymer (1.0 eq 3-Aminopropylmethyldiethoxysilane)

The coating composition of Example 10 contains 1.0 equivalents of 3-aminopropylmethyldiethoxysilane. The procedure of Example 4 was followed, except that 2.85 g of 3-aminopropylmethyldiethoxysilane was added to 100 g of the latex of Example 7.

EXAMPLE 11

Acid-Amine Polymer (1.0 eq Piperazine)

The composition of Example 11 contains 1.0 equivalents of piperazine. The procedure of Example 4 was followed, except that 0.64 g of piperazine was added to 100 g of the latex of Example 7.

EXAMPLE 12

Acid-Amine Polymer (1.0 eq Triethylene Glycol Diamine)

The composition of Example 12 contains 1.0 equivalents of triethylene glycol diamine. The procedure of Example 4 was followed, except that 1.1 g of triethylene glycol diamine was added to 100 g of the latex of Example 7.

EXAMPLE 13

Acid-Amine Polymer (1.0 eq Lysine)

The composition of Example 13 contains 1.0 equivalents of lysine. The procedure of Example 4 was followed, except that 1.09 g of lysine was added to 100 g of the latex of Example 7.

EXAMPLE 14

The compositions of Examples 10–13 were tested for resistance properties and durability. Examples 10–14 demonstrate the improvement in durability and resistance properties of the invention, using an anhydride polymer postreacted with four different amine functional compounds.

| Property | Ex 1* | Ex 2* | Ex 3* | Ex 10 | Ex 11 | Ex 12 | Ex 13 |
|---|---|---|---|---|---|---|---|
| VOC | 8 | 8 | 0 | 2 | 2 | 2 | 2 |
| Film Formation | Exc | Exc | Exc | VG | VG | VG | VG |
| Gloss, 60°/20° | 68/32 | 69/34 | 66/27 | 65/29 | 66/32 | 70/30 | 65/28 |
| Recoatability | Good | Good | Good | Good | Good | Good | Good |
| Water Resistance | Good | Very Good | Very Good | Very Good | Very Good | Very Good | Very Good |
| Detergent Resistance | Fair | Very Good | Exc | Exc | Very Good | Very Good | Very Good |
| Removability | Exc | Fair | Poor | Fair | Fair | Fair | Fair |
| Mar Resistance | 3 | 3 | 5 | 3 | 4 | 4 | 4 |
| Scuff Mark Resistance | 0.7 | 0.7 | 1.2 | 0.5 | 0.7 | 0.8 | 0.65 |
| Black Heel Mark Resistance | 0.5 | 0.6 | 1.5 | 0.6 | 0.85 | 0.75 | 0.7 |

*Comparative

The results show that mar, scuff and black heel mark resistance is increased in coating compositions of this invention having anhydride functionality and amine functional compounds without the use of volatile organic compounds.

EXAMPLE 15

Anhydride Latex Containing No Amine Functionality (Comparative)

The procedure of Example 3 was followed, except that the monomer composition was 47 BA/21 STY/21 MMA/10 MAAn/1 MAA. This yielded a polymer having a Tg of 37° C.

EXAMPLE 16

Acid-Anhydride Polymer (1.0 eq Aminopropyl Morpholine)

This latex contains 1 equivalents of aminopropylmorpholine. The procedure of Example 4 was followed, except that 4.29 g of aminopropylmorpholine was added to 100 g of the latex Example 15.

EXAMPLE 17

The compositions of Examples 15–16 were tested for resistance properties and durability. Examples 15–17 demonstrate the improvement in durability and resistance properties of the invention using polymers with a high level of anhydride-functional monomer and styrene. The coating composition of Example 15 is a comparative containing no amine.

| Property | Example 1* | Example 2* | Example 15* | Example 16 |
|---|---|---|---|---|
| VOC | 8 | 8 | 3 | 3 |
| Film Formation | Excellent | Excellent | Very Good | Excellent |
| Gloss, 60°/20° | 68/32 | 69/34 | 70/37 | 70/42 |
| Recoatability | Good | Good | Good | Good |

-continued

| Property | Example 1* | Example 2* | Example 15* | Example 16 |
|---|---|---|---|---|
| Water Resistance | Good | Very Good | Very Good | Very Good |
| Detergent Resistance | Fair | Very Good | Excellent | Very Good |
| Removability | Excellent | Fair | Poor | Good |
| Mar Resistance | 3 | 3 | 5 | 3 |
| Scuff Mark Resistance | 0.7 | 0.7 | 1.2 | 0.7 |
| Black Heel Mark Resistance | 0.5 | 0.6 | 0.8 | 0.11 |

*Comparative

The results show that mar, scuff and black heel mark resistance is increased in coating compositions of this invention having anhydride functionality and amine functional compounds and low levels of volatile organic compounds.

EXAMPLE 18

Anhydride Latex Containing No Amine Functionality (Comparative)

The procedure of Example 3 was followed, except that the monomer composition was 27 BA/21 STY/41 MMA/10 MAAn/1 MAA. This yielded a polymer having a Tg of 80° C.

EXAMPLE 19

Acid-Anhydride Polymer (1.0 eg Aminopropyl Morpholine)

This latex contains 1 equivalents of aminopropylmorpholine. The procedure of Example 4 was followed, except that 4.29 g of aminopropyl morpholine was added to 100 g of the latex Example 18.

EXAMPLE 20

The compositions of Examples 18–19 were tested for resistance properties and durability. Examples 18–20 demonstrate the improvement in durability and resistance properties of the invention using polymers with a higher level of anhydride-functional monomer and using a polymer having a higher Tg than that of previous Examples. The coating composition of Example 18 is a comparative containing no amine.

| Property | Example 1* | Example 2* | Example 18* | Example 19 |
|---|---|---|---|---|
| VOC | 8 | 8 | 4 | 4 |
| Film Formation | Excellent | Excellent | Excellent | Excellent |
| Gloss, 60°/20° | 68/32 | 69/34 | 68/30 | 70/34 |
| Recoatability | Good | Good | Good | Good |
| Water Resistance | Good | Very Good | Very Good | Very Good |
| Detergent Resistance | Fair | Very Good | Good | Good |
| Removability | Excellent | Fair | Fair | Fair |
| Mar Resistance | 3 | 3 | 4 | 3 |
| Scuff Mark Resistance | 0.5 | 0.7 | 0.7 | 0.35 |
| Black Heel Mark Resistance | 0.6 | 0.5 | 0.7 | 0.05 |

*Comparative

The results show that mar, scuff and black heel mark resistance is increased in coating compositions of this invention having anhydride functionality and amine functional compounds and low levels of volatile organic compounds.

EXAMPLE 21

Anhydride Latex Containing No Amine Functionality (Comparative)

The procedure of Example 3 was followed, except that the monomer composition was 27 BA/21 STY/41 MMA/10 MAAn/1 MAA. This latex was formulated into the test composition as described in Example 19 except that 4 g of diethylene glycol ethyl ether were used.

EXAMPLE 22

Acid-Amine Polymer (1.0 eq N,N-Dimethylethylenediamine)

This latex contains 1 equivalents of N,N-dimethylethylenediamine. The procedure of Example 4 was followed, except that 2.29 g of N,N-dimethylethylenediamine was added to 100 g of the latex Example 21.

EXAMPLE 23

The compositions of Examples 21–22 were tested for resistance properties and durability. Examples 21–23 demonstrate the improvement in durability and resistance properties of the invention using a polymer containing anhydride-functional monomer and post treated with an amine functional compound. The coating composition of Example 21 is a comparative containing no amine.

| Property | Example 1* | Example 2* | Example 21* | Example 22 |
|---|---|---|---|---|
| VOC | 8 | 8 | 4 | 4 |
| Film Formation | Excellent | Excellent | Excellent | Excellent |
| Gloss, 60/20 | 68/32 | 69/34 | 68/30 | 70/30 |
| Recoatability | Good | Good | Good | Good |
| Water Resistance | Good | Very Good | Very Good | Very Good |
| Detergent Resistance | Fair | Very Good | Good | Good |
| Removability | Excellent | Fair | Fair | Poor |
| Mar Resistance | 3 | 3 | 4 | 3 |
| Scuff Mark Resistance | 0.5 | 0.7 | 0.7 | 0.4 |
| Black Heel Mark Resistance | 0.6 | 0.5 | 0.7 | 0.08 |

*Comparative

The results show that mar, scuff and black heel mark resistance is increased in coating compositions of this invention having anhydride functionality and amine functional compounds and low levels of volatile organic compounds.

EXAMPLE 24

The coating composition of Example 24 represents a non-metal containing, single package aqueous based polymer prepared according to the technology taught in U.S. Pat. No. 4,760,110 by Das. A polymer latex was prepared with a monomer composition of 50 (32 BA/53 MMA/15 MAA)// 50 (15 BA/75 STY/10 DMAEMA) (dimethylaminoethylmethacrylate). This latex was formulated into the test composition as described in Example 22 except that 8 g of diethylene glycol ethyl ether was used. The coating composition of Example 24 was tested for durability and resistance properties. The results are shown below.

| Property | Example 1* | Example 2* | Example 24 |
|---|---|---|---|
| VOC | 8 | 8 | 8 |
| Film Formation | Excellent | Excellent | Excellent |
| Gloss, 60°/20° | 68/32 | 69/34 | 70/32 |
| Recoatability | Good | Good | Good |
| Water Resistance | Good | Very Good | Very Good |
| Detergent Resistance | Fair | Very Good | Very Good |
| Removability | Excellent | Fair | Fair |
| Mar Resistance | 3 | 3 | 3 |
| Black Heel Mark Resistance | 0.5 | 0.6 | 0.35 |
| Scuff Mark Resistance | 0.7 | 0.7 | 0.4 |

*Comparative

EXAMPLE 25

The coating composition of Example 25 represents a non-metal containing, single package aqueous based polymer prepared according to the technology taught in U.S. Pat. No. 3,404,114 by Snyder et al. A polymer latex was prepared with with a monomer composition of 22 BA/62.5 MMA/10 MAA/5 DMAPMA (dimethylaminopropylmethacrylate). This latex was formulated into the test composition as described in Example 24 except that 8 g of diethylene glycol ethyl ether was used. The coating composition of Example 25 was tested for durability and resistance properties. The results are shown below.

| Property | Example 1* | Example 2* | Example 25 |
|---|---|---|---|
| VOC | 8 | 8 | 8 |
| Film Formation | Excellent | Excellent | Excellent |
| Gloss, 60°/20° | 68/32 | 69/34 | 65/28 |
| Recoatability | Good | Good | Good |
| Water Resistance | Good | Very Good | Good |
| Detergent Resistance | Fair | Very Good | Good |
| Removability | Excellent | Fair | Good |
| Mar Resistance | 3 | 3 | 2 |
| Black Heel Mark Resistance | 0.5 | 0.6 | 0.3 |
| Scuff Mark Resistance | 0.7 | 0.7 | 0.4 |

*Comparative

What is claimed is:

1. An amine-strippable, detergent resistant aqueous polish composition comprising a self-crosslinking, ambient curing, film-forming acid-amine latex, the latex comprising between 0.5 and 12.5 wt % total acid functionality and between 1.0 and 22.5 wt % total amine functionality, based on the total monomer weight, wherein the acid-amine latex is an acid- and amine-functional polymer formed by the free-radical initiated polymerization process of:

(a) first, copolymerizing an anhydride monomer with an ethylenically unsaturated monomer to produce an anhydride polymer, wherein the amount of anhydride monomer is between 0.1 and 50.0 wt % based on the total monomer weight;

(b) followed by addition of base thereto;

(c) followed immediately by addition of between 0.001 and 2.0 moles of diamine per mole of anhydride; and (d) allowing the components to react.

2. The composition of claim 1, wherein the latex comprises between 3 and 10 wt % acid functionality and between 1.5 and 16 wt % amine functionality, based on the total monomer weight.

3. The composition of claim 1, wherein the latex comprises between 6.5 and 8.5 wt % acid functionality and between 3 and 6 wt % amine functionality, based on the total monomer weight.

4. The composition of claim 1, wherein the amount of volatile organic compounds is 8 wt % or less, based on the total weight of the composition.

5. The composition of claim 4, wherein the amount of volatile organic compounds is less than 4 wt %.

* * * * *